(12) United States Patent
Bucher et al.

(10) Patent No.: US 7,676,690 B2
(45) Date of Patent: Mar. 9, 2010

(54) MIRRORING OF ACTIVITY BETWEEN ELECTRONIC DEVICES

(75) Inventors: Timothy Bucher, Los Altos, CA (US); Arthur Anthonie Van Hoff, Menlo Park, CA (US)

(73) Assignee: Dell Products L.P., Round Rock, TX (US)

( * ) Notice: Subject to any disclaimer, the term of this patent is extended or adjusted under 35 U.S.C. 154(b) by 358 days.

(21) Appl. No.: 11/754,834

(22) Filed: May 29, 2007

(65) Prior Publication Data

US 2008/0010501 A1 Jan. 10, 2008

Related U.S. Application Data

(60) Provisional application No. 60/809,217, filed on May 30, 2006.

(51) Int. Cl.
*G06F 11/00* (2006.01)

(52) U.S. Cl. ......................................................... 714/6

(58) Field of Classification Search ........................ None
See application file for complete search history.

(56) References Cited

U.S. PATENT DOCUMENTS

| | | | | |
|---|---|---|---|---|
| 5,870,537 A * | 2/1999 | Kern et al. | | 714/6 |
| 5,928,367 A * | 7/1999 | Nelson et al. | | 714/6 |
| 6,542,962 B2 * | 4/2003 | Kodama et al. | | 711/114 |
| 6,697,960 B1 * | 2/2004 | Clark et al. | | 714/15 |
| 6,839,865 B2 * | 1/2005 | Gould et al. | | 714/6 |
| 6,910,078 B1 * | 6/2005 | Raman et al. | | 709/231 |
| 6,925,541 B2 * | 8/2005 | Yamagami | | 711/162 |
| 7,103,797 B1 * | 9/2006 | Wahl et al. | | 714/6 |
| 7,197,660 B1 * | 3/2007 | Liu et al. | | 714/4 |
| 7,246,258 B2 * | 7/2007 | Chen et al. | | 714/6 |
| 7,376,859 B2 * | 5/2008 | Boyd et al. | | 714/3 |
| 7,461,226 B2 * | 12/2008 | Iwamura et al. | | 711/162 |
| 7,603,581 B2 * | 10/2009 | Boyd et al. | | 714/6 |
| 7,606,940 B2 * | 10/2009 | Yamagami | | 709/246 |
| 2002/0087588 A1 | 7/2002 | McBride et al. | | |
| 2003/0233518 A1 * | 12/2003 | Yamagami et al. | | 711/114 |
| 2004/0230756 A1 | 11/2004 | Achiwa et al. | | |
| 2005/0246575 A1 * | 11/2005 | Chen et al. | | 714/6 |
| 2006/0064470 A1 | 3/2006 | Sargent et al. | | |
| 2006/0161554 A1 * | 7/2006 | Lucovsky et al. | | 707/10 |
| 2006/0194596 A1 * | 8/2006 | Deng | | 455/466 |
| 2007/0028139 A1 * | 2/2007 | Wahl et al. | | 714/6 |
| 2009/0271633 A1 * | 10/2009 | Cohen | | 713/185 |
| 2009/0288150 A1 * | 11/2009 | Toomim et al. | | 726/5 |

* cited by examiner

*Primary Examiner*—Christopher S McCarthy
(74) *Attorney, Agent, or Firm*—Workman Nydegger (57) ABSTRACT

Two or more electronic devices each include an output engine and an output device for presenting data, including mirrored data. A consumer electronic device receives a request from a mirroring device for mirrored data or transmits a request for customer service to the mirroring device. Thereafter, the consumer electronic device provides the mirrored data to the mirroring device. The mirroring device may be similar or different from the consumer electronic device. The mirroring device presents the mirrored data to a user of the mirroring device. Alternately or additionally, the mirroring device analyzes the mirrored data to identify problems with the consumer electronic device. The consumer electronic device and/or the mirroring device can transmit identifiers associated with the other device over a network connection to determine whether the other device is online.

19 Claims, 5 Drawing Sheets

MIRRORING OF ACTIVITY BETWEEN ELECTRONIC DEVICES

CROSS-REFERENCE TO RELATED APPLICATIONS

This application claims the benefit of U.S. Provisional Patent Application Ser. No. 60/809,217 filed May 30, 2006, which application is incorporated herein by reference in its entirety.

BACKGROUND OF THE INVENTION

1. The Field of the Invention

The present invention relates generally to electronic devices. More particularly, embodiments of the invention relate to systems and methods for mirroring data between two or more electronic devices.

2. The Relevant Technology

Numerous forms of electronic devices are proliferating today. One example is satellite radio, or Satellite Digital Audio Radio Service (SDARS), which is the broadcast of digital audio programming via satellites directly to users. Through satellite radio, subscribers can receive high quality, uninterrupted, digital data such as radio over more than one hundred radio channels. The digital data may include, for example, digital quality music, talk radio, sports, news, weather, and the like. Often, a user of satellite radio has a small portable device they use to receive the digital data stream. Other examples of electronic devices are portable digital audio devices, often referred to as MP3 players, portable CD players, portable DVD players, notebook computers, personal digital assistants ("PDAs") and the like.

Regardless of the type of electronic device, it is often desirable for multiple users to simultaneously experience (e.g., view/hear) content or other device output. For instance, friends frequently wish to share music on their portable music players. However, many portable music players in use today include a single headphone jack and no other means for audio output, which can prevent the friends from simultaneously experiencing the music. As another example, a user of a PDA or other device may wish to share a visual presentation or other digital content stored on the PDA with business associates or other individuals. However, the relatively small screen sizes of most PDAs significantly limits the number of individuals that can experience visual content presented thereon. As yet another example, users of consumer electronic devices often experience problems with their devices that can be easier to resolve by showing to a customer service representative than by attempting to explain to a customer service representative over the phone. However, customer service representatives are often located far from users.

Various methods have been attempted for overcoming these challenges. Friends may connect their portable music player to a speaker system or share headphones. Either or both of these can be bothersome to the public, cumbersome and/or unsanitary. PDA users can display their presentations on a projector or provide hardcopies of presentations if the necessary resources, such as projectors and copy machines, are available. Users of consumer electronic devices can go to a retail outlet where their device was purchased and request help from a knowledgeable employee.

Clearly, conventional methods for overcoming these and other challenges are inadequate. Accordingly, improved methods and systems permitting multiple users to experience content and other device output are needed.

BRIEF SUMMARY OF THE INVENTION

These and other limitations are overcome by embodiments of the present invention, which include electronic devices having an output engine and an output device, such as a graphical display, speaker, headphone jack, and the like or any combination thereof. The output device may be part of a user interface that also includes an input mechanism such as a click wheel, touch screen, or other input mechanism. Moreover the electronic devices can connect to a wired and/or wireless network through a network connection.

According to one embodiment of the invention, data executed, created or rendered on a first device is mirrored to a second device. Additionally, the mirrored data can be presented to a user of the second device simultaneously with the data executed, created, or rendered on the first device. Both devices may be the same device type, such as consumer electronic devices, or different device types, such as a consumer electronic device and a mirroring device used for providing customer service in one example.

In one embodiment of the invention, a mirroring device used for providing customer service receives a request for customer service from a consumer electronic device. In response, data from the consumer electronic device is mirrored by the mirroring device, which may include receiving the mirrored data from the consumer electronic device. The mirrored data can then be analyzed to identify a problem such as a problem with a user's use of the consumer electronic device and/or a functional problem with the consumer electronic device itself.

In another embodiment of the invention, two or more electronic devices mirror data. A first electronic device transmits a device identifier associated with a second electronic device over a network connection and receives a confirmation over the network connection verifying that the second electronic device is online. The first electronic device then requests mirrored data from the second electronic device. After receiving the mirrored data, the first electronic device presents the mirrored data to a user of the first electronic device. In some aspects of the invention, the first electronic device receives a request from the second electronic device for mirrored data and transmits mirrored data from the first electronic device to the second electronic device.

These and other advantages and features of the present invention will become more fully apparent from the following description and appended claims, or may be learned by the practice of the invention as set forth hereinafter.

BRIEF DESCRIPTION OF THE DRAWINGS

To further clarify the advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

In the following detailed description of the preferred embodiments, reference is made to the accompanying drawings which form a part hereof, and in which are shown by way of illustration specific embodiments wherein the invention may be practiced. It is to be understood that the drawings are diagrammatic and schematic representations of such example embodiments and, accordingly, are not limiting of the scope of the present invention, nor are the drawings necessarily drawn to scale.

Embodiments of the present invention relate to methods and systems for mirroring data between two or more devices. One embodiment of the invention is directed to providing customer support for users of consumer electronic devices. Accordingly, a mirroring device, such as a computer, receives a customer service request from a consumer electronic device and data from the consumer electronic device is mirrored to the mirroring device. The mirroring device may render or otherwise present the mirrored data to a user of the mirroring device (such as a customer service representative). Additionally, the mirrored data can be analyzed to troubleshoot problems that the user of the consumer electronic device is experiencing.

Alternately, two or more devices mirror data between each other in order to share content. A first electronic device transmits a device identifier for a second electronic device over a network connection and receives a confirmation verifying that the second electronic device is online. Either one of the devices can request mirrored data from the other. Mirrored data is transmitted to the requesting device and can be presented to the user of the requesting device simultaneously with the data presented on the other device.

Figure 1:
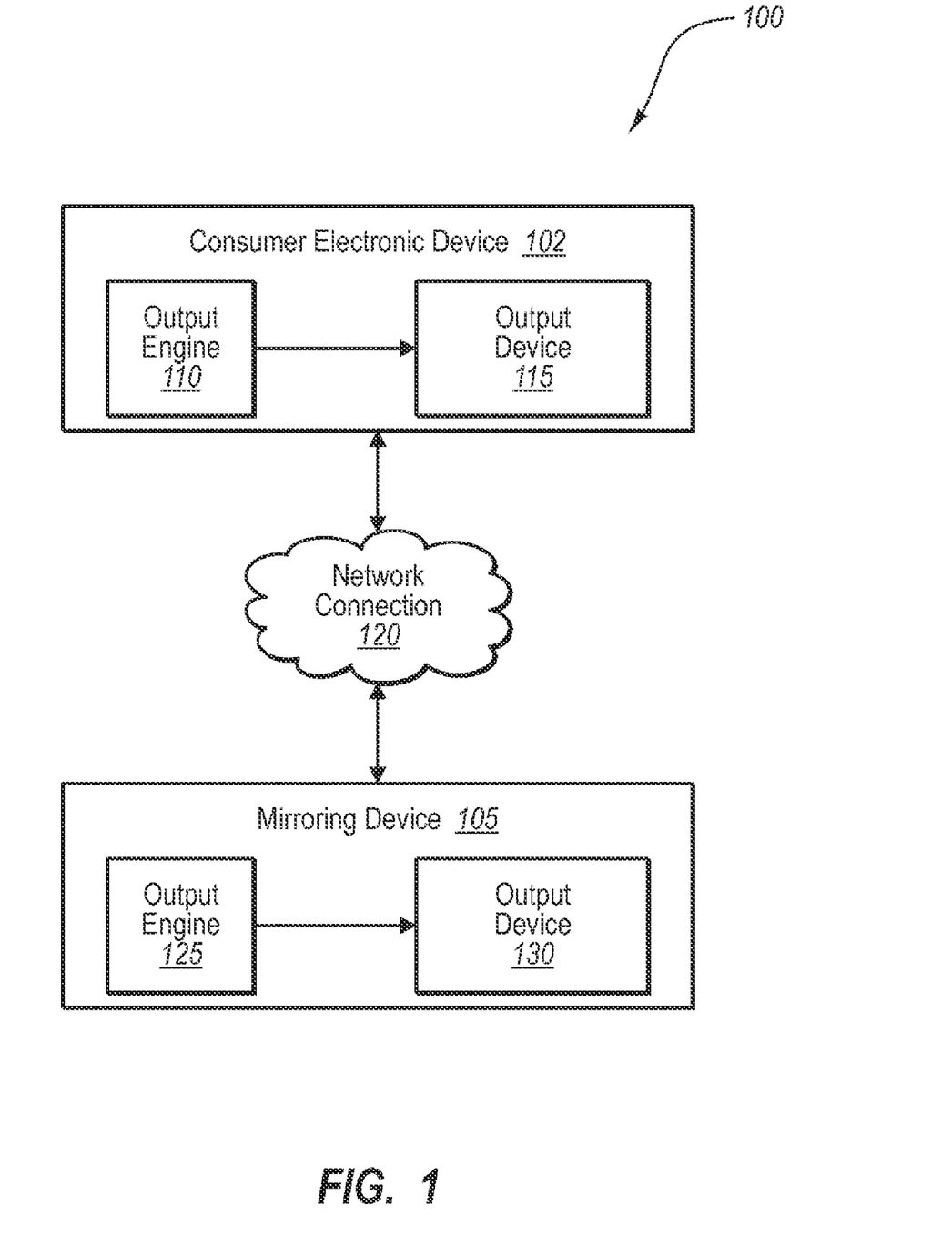
FIG. 1 illustrates a system for mirroring data between a consumer electronic device and a mirroring device.

FIG. 1 illustrates an example system 100 in which embodiments of the invention can be practiced. The system includes an electronic device 102, a network 120, and a mirroring device 105. The electronic device 102 has a user interface that includes an output device 115, such as a display or speakers, in one embodiment. The electronic device 102 may also include an input mechanism as part of the user interface, for example, a click wheel, buttons, soft keys, and the like or any combination thereof. Using the user interface, a user can navigate content stored on the electronic device 102, configure device settings, select channels, output data (audio, video, etc.), select specific networks, and the like.

The electronic device 102 is a network connectable device using the network connection 120. The electronic device 102, for example, may include the ability to access multiple types of wireless networks, including 802.11 related networks (e.g., WiFi) and others. In addition to 802.11 type networks, the electronic device 102, may have access to other radio frequency networks such as a Bluetooth network, a cellular network, a satellite network, terrestrial RF networks (e.g., WiMAX, AM, FM, DAB (digital audio broadcasting)), and the like or any combination thereof. Moreover, the electronic device 102 may have access to a public switched telephone network ("PSTN") and/or an Internet Protocol ("IP") network. The network connection 120 can also include a hard-wired network connection including, but not limited to, a USB connection. Thus, the network connection 120 can include wireless and/or hardwired connections.

In one embodiment of the invention, the electronic device 102 may interact with multiple content providers by connecting to the Internet through the network connection 120. Accordingly, the electronic device 102 may access satellite broadcast content over the Internet rather than over a satellite network. The electronic device 102 may also be able to access terrestrial radio broadcasts (digital radio, FM, AM, and the like). Further, the electronic device 102 may also be able to receive and provide other media content, such as world-wide web content, television content, video content and the like or any combination thereof.

In one example, the consumer electronic device 102 may be a wireless-enabled personal music device that can access audio media content through the Internet using the network connection 120. According to this embodiment, the user of the consumer electronic device 102 can access media content whenever the consumer electronic device 102 is within range of a wireless access point or whenever access to a network (wired and/or wireless) is present.

Wireless communication, such as 802.11 networks and associated hotspots, have been increasingly prevalent for connecting to networks. In fact, there are wireless access points in many homes, hotels, restaurants, and even parks. Certain embodiments disclosed herein use wireless networks to mirror data and/or actions originating on the consumer electronic device 102 on a mirroring device 105. In some embodiments the mirroring device 105 is a second consumer electronic device or a different type of electronic device. The consumer electronic device 102 can include a digital music player, digital video player, video camera, cellular phone, PDA, television, laptop computer, or any other consumer electronic device or combination thereof. A person with a wireless enabled consumer electronic device 102 can connect to the Internet when in proximity of an access point such as a hotspot.

The mirroring device 105 receiving the mirrored data typically has a set of rendering assets that is sufficient to permit the data and/or actions originating on the consumer electronic device 102 to be at least partially duplicated on the mirroring device 105. As used herein, the term "mirrored data" refers to data that has been or is being executed, created and/or rendered on the consumer/originating electronic device. Mirrored data specifically includes, without limitation, commands representing and/or describing actions taken by a user of the consumer/originating device; visual output such as skins, wallpapers, and graphics for user interfaces displayed on the consumer/originating device, as well as screenshots of the device display; audio, video, and/or text files/media such as pictures, music, music clips, presentations, movies, movie clips, text, training information, other audio and/or video media content, etc. Mirrored data can additionally include combinations and the like of the described data.

Advantageously, the mirroring activity implemented according to embodiments of the invention can be used for 1) customer assistance, 2) distribution of presentations or other media among a group of people, 3) displaying different data (skins, for example) on different devices, and/or 4) sharing of digital content between friends or others who interact in a network, for example.

Mirrored data can be used for consumer support according to several embodiments. For example, a customer may encounter problems with the consumer electronic device 102. The consumer can directly contact the mirroring device 105 (e.g. a customer support device) via a network connection 120, such as an 802.11 compatible connection, using the consumer electronic device 102. Mirrored data can be transmitted to the mirroring device such that a customer support technician can analyze the mirrored data at the mirroring device 105 to troubleshoot problems encountered by the consumer. The support technician can troubleshoot the consumer electronic device 102, or even take over control of the consumer electronic device 102, to identify functional problems with the consumer electronic device 102 or problems with the user's operation of the consumer electronic device 102. For example, an output engine 110 of the consumer electronic device 102 and an output engine 125 of the mirroring device 125 at a consumer service center can be synchronized such that both the consumer electronic device 102 and the mirroring device 105 are simultaneously (or close in time) receiving and/or accessing the same media content, such as video and/or audio media. As used herein, "output engine" refers to assets for the output of any media whether visual or audio. Therefore, the output engines 110 and 125 can include assets capable of outputting the content or executing the commands transferred between the consumer electronics device 102 and the mirroring device 105.

Several embodiments also enable connectivity in a peer-to-peer mode, which enables electronic devices to connect directly with each other and mirror data between the connected devices. This mirroring can be enabled between online devices such that "friends" can mirror data executed, created or rendered on each other's consumer electronic devices. For example, referring again to FIG. 1, the output engine 110 (e.g. a rendering engine) of the consumer electronic device 102 can be synchronized with the output engine 125 (e.g. a rendering engine) of the mirroring device 105 such that the consumer electronic device 105 and the mirroring device 105 are simultaneously outputting (e.g., presenting or displaying) the same data as associated media.

The electronic device 102 can access media content through the Internet using wireless network connections and mirror the media content with other devices. The music or other media content (e.g., audio, video, etc.) can be provided over the Internet by any of a number of content providers, including satellite radio content providers and other online broadcasters. The user of the electronic device 102 can access music whenever he or she is in range of a wireless access point (e.g., WiFi hotspot). The consumer electronic device 102 also can access music from and/or store music to the user's library and can receive "terrestrial" radio broadcasts (e.g., FM and AM), and can record broadcasted music (depending on copyright issues). The consumer electronic device 102 can also have a satellite radio link for receiving content over a satellite network. The consumer electronic device 102 can also access other media content, such as the world-wide web and video content, such as television. Users are permitted to engage in social activities with friends/buddies who are also using the network. Many of these social activities relate to music or other content that is stored, played, streamed, etc.

FIG. 1 illustrates a system for mirroring data between the consumer electronic device 102 and the mirroring device 105. The consumer electronic device 102 can be any consumer electronic device as discussed above. In one embodiment, the consumer electronic device 102 includes an output engine 110 for rendering data as pixels of an image on an output device 115 (e.g. a display). The output engine 110 can also include the necessary assets for outputting data such as video, text, and audio data. The output device 115 can be part of a user interface (UI) for receiving inputs from a user of the consumer electronic device 102 and outputting data, for example by visually rendering an image and/or audibly rendering audio data.

The data output on the device 102, (e.g., visually and/or audibly) by the output engine 110 is mirrored and transmitted via a wireless connection 120 to the mirroring device 105. The transmitted mirrored data can also include commands representing actions by a user of the consumer electronic device 102.

The mirroring device 105 includes an output engine 125 that displays the mirrored data on an output device 130 of the mirroring device 105. According to one embodiment, the output engine 110 of the consumer electronic device 102 and the output engine 125 of the mirroring device 105 can be synchronized such that the users of both the consumer electronic device 102 and the mirroring device 105 are simultaneously experiencing (e.g., viewing and/or listening to) the same media on their respective displays 115 and 130. The data transferred between the consumer electronic device 102 and the mirroring device can be transmitted via the wireless or hardwired network connection 120.

The mirroring device 105 can be the same type of consumer electronic device as the consumer electronic device 102 or the mirroring device 105 can be a different electronic device than the consumer electronic device 102, such as a computer. In one embodiment, the mirroring device 105 is a troubleshooting electronic device at a customer support center. As such, the mirroring device 105 can have a larger display and different hardware than the consumer electronic device 102. The mirroring device 105 can also include a processor and troubleshooting software for analyzing the mirrored data and commands describing actions taken by the user of the consumer electronic device 102 to troubleshoot problems encountered by the user of the consumer electronic device 102. The problems encountered by the user of the consumer electronic device 102 can be due to user error or equipment error and these problems can be identified by a user of the mirroring device 105 and/or by the mirroring device itself.

The user of the consumer electronic device 102 may be a customer who purchased the consumer electronic device 102 from a retailer and the user of the mirroring device 105 may be a customer support employee of the retailer or manufacturer of the consumer electronic device 102, for example. Thus, the embodiment illustrated in FIG. 1 can present a new point of customer support communication between a consumer and a customer support technician such that problems encountered with the consumer electronic device 102 that are based on user error, as opposed to functional problems with the consumer electronic device 102 itself, can be remedied without requiring the customer to return the consumer electronic device 102 to the retailer claiming that the problem is a result of the consumer electronic device 102. Moreover, a manufacturer can require such troubleshooting to ensure that the consumer is not merely operating the consumer electronic device 102 incorrectly. Thus, consumer satisfaction and manufacturer satisfaction can both be improved.

In one embodiment of the invention, the network connection 120 illustrated in FIG. 1 includes an 802.11 based network and/or network connection. However, the network connection 120 can also or alternately include a LAN, a WAN, the Internet, and/or a peer to peer connection. Thus, the consumer electronic device 102 can communicate the mirrored data to the network via many different network environments.

Instruction or other information can also be communicated from the mirroring device 105 to the consumer electronic device 102 via the network connection 120. For example, if the consumer electronic device 102 and the mirroring device 105 are similarly provisioned (i.e., have the same hardware or are configured the same) and/or if the mirroring device 105 can emulate the consumer electronic device, then commands issued by the consumer electronic device 102 can be transmitted over the network connection 120 and implemented, or emulated by the mirroring device 105. Accordingly, a command executed at the consumer electronic device 102 can also be executed at the mirroring device 105. The result is that the consumer electronic device 102 and the mirroring device 105 should be in the same state. In this example, it is not necessary to transmit a screenshot, although screenshots are contemplated in some embodiments of the invention. Rather, transmitting commands from one device to the other enables the output engines 110 and 125 to operate the electronic devices 102 and 105 such that the consumer electronic device 102 and the mirroring device 105 mirror data for a particular purpose, such as troubleshooting, sharing snippets, receiving streaming media, receiving presentations, for training, etc. Further, the bidirectional aspect of the connection 120 ensures that either device can, in several embodiments, issue commands that are implemented at the other device. It is possible, however, to implement different user interfaces by having assets on the mirrored device 105 that are different than those on consumer electronic device 102 being mirrored.

Figure 2:
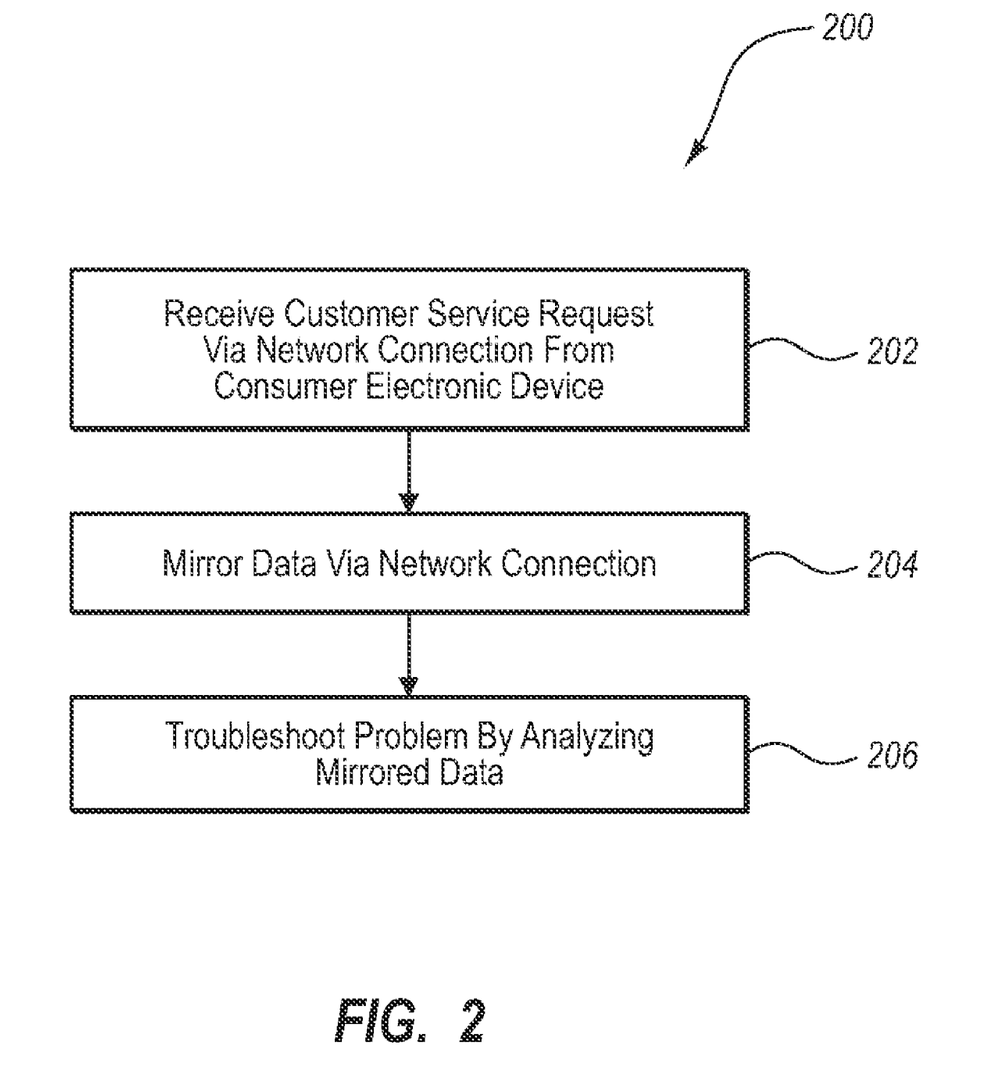
FIG. 2 illustrates a method for mirroring data between a consumer electronic device and a mirroring device.

Referring to FIG. 2, a method for mirroring data between a consumer electronic device and a mirroring device is illustrated. A request for customer service is received 202 via the network connection from the consumer electronic device. In one embodiment, the request can identify the type of consumer electronic device from which the request is received. The request can also identify the user and associated information describing a problem encountered with the consumer electronic device.

Mirrored data are mirrored 204 at the mirroring device via the network connection. This permits a user of the mirroring device to see and/or hear what the user of the consumer electronic device is doing and how the consumer electronic device is operating. As such, both the consumer electronic device and the mirroring device can have the same functional assets. For example, output engines at both the consumer electronic device and the mirroring device can be synchronized such that a user of the mirroring device can execute the same commands and view the same imagery or listen to the same audio as the user of the consumer electronic device to identify actions taken by the user of the consumer electronic device. The mirroring device can also receive additional information such as information describing upgrades to the consumer electronic device and configuration settings of the consumer electronic device.

The mirrored data can be analyzed 206 to troubleshoot problems with the consumer electronic device, or problems with the user's operation of the consumer electronic device. The analysis can be conducted by the user of the mirroring device and the analysis can also include automated analysis by troubleshooting software running on the mirroring device. The mirroring device can be the same type of electronic device as the consumer electronic device or the mirroring device can be a different type of electronic device as the consumer electronic device.

The mirroring device can transmit information to the consumer electronic device via the network connection in response to results of the analysis. The information can include recommendations such as a set of instructions to fix the problem identified. When there is a problem with the consumer electronic device that cannot be fixed by the user, the information can include instructions to the user to return the consumer electronic device to the retail location where the consumer electronic device was purchased. The information can also provide instructions of where the user should take the consumer electronic device for repairs. The information can also provide reconfiguration instructions and/or the user of the mirroring device can take over control of the consumer electronic device to fix configuration problems.

According to one embodiment, the mirroring device can also be another consumer electronic device and the mirrored data can be simultaneously experienced (e.g., viewed and/or heard) by the users of both consumer electronic devices. According to another embodiment, content providers, for example, can mirror data to user devices in a manner that enables the user to preview the content as it will be experienced on the user's device.

The mirrored data can be mirrored to multiple mirroring devices and multiple consumer electronic devices can mirror data to a single, or multiple, mirroring devices.

Figure 3:
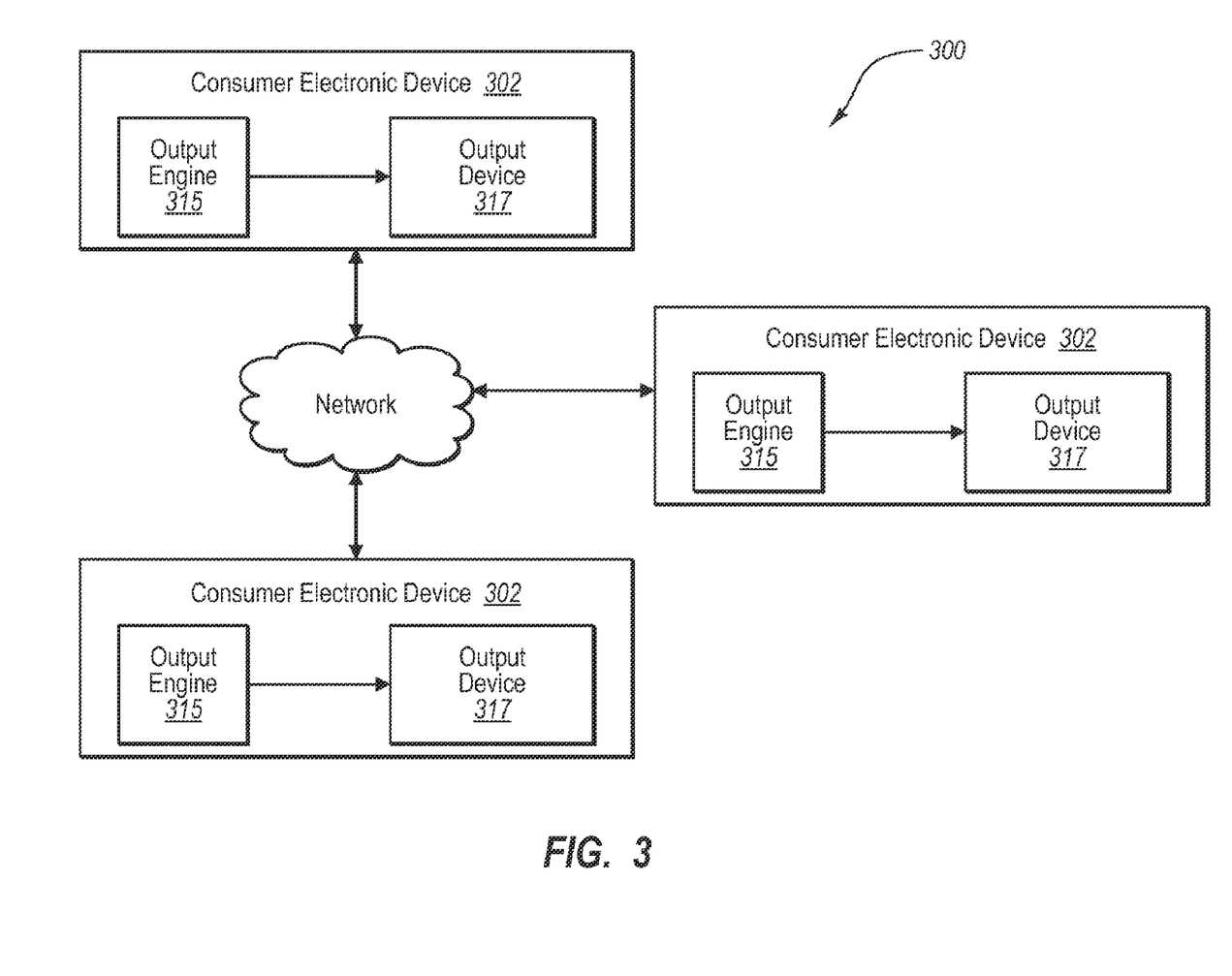
FIG. 3 illustrates a system for mirroring data between at least two consumer electronic devices.

Referring to FIG. 3, a system 300 for mirroring data between multiple consumer electronic devices 302 is illustrated. The consumer electronic devices 302 can be the same type of consumer electronic devices or the consumer electronic devices 302 can be different types of consumer electronic devices. Data is mirrored between at least two of the consumer electronic devices 302 such that the at least two consumer electronic devices 302 are synchronized and presenting (e.g., visually and/or audibly) the same media substantially simultaneously. Each consumer electronic device 302 can be coupled to a network 305 via a network connection 310 such as a wireless access point, an 802.11 connection and other wireless or hardwired connections. The network 305 can include a LAN, WAN, and/or the Internet.

The consumer electronic devices 302 can be members of a "friends" list, although this is not required in all embodiments of the invention. The friends list can be a set of consumer electronic devices 302 that are associated with each other. In one embodiment, the members of the friends list are queried to identify those that are online. For example, members can be associated with an identifier and each identifier of the friends list can be transmitted over the network to determine whether the respective consumer electronic devices 302 are currently connected to the network 305. Alternatively, the status of members that are online can be automatically pushed to the consumer electronic devices 302.

Requests to mirror data can be sent to the members of the friends list. For example a request to mirror audio and/or visual data can be sent and, if accepted, the audio and/or visual data can be mirrored and experienced by the users of the consumer electronic devices 302. Thus, the different members of the friends list can experience what each other are doing by synchronizing an output engine 315 coupled to an output device 317 on their consumer electronic device 302 with an output engine 315 coupled to an output device 317 of another consumer electronic device 302.

As previously stated, mirroring can be achieved by transmitting commands. The mirroring devices or the output engines can then execute those commands such that the devices are mirrored.

Text, voice and/or video messages can also be communicated. The text, audio, and/or video messages can be sent in response to experiencing (e.g., viewing and/or hearing) the mirror data. The voice messages can include voice chat and other recorded audio. The messages can also include video content, such as recorded, or prerecorded, video snippets. The messages can also include audio instant messaging and shared content for enjoyment.

In one embodiment, the mirrored data includes a presentation, which may be used for training purposes. The presentation can include visual and/or audio data that can be mirrored via connections 310. Thus, the presentation data rendered on each of the consumer electronic devices 302 can be synchronized such that each of the users of the consumer electronic devices 302 is simultaneously experiencing the presentation.

The mirroring can be bi-directional between the consumer electronic devices 302. For example, each of the consumer electronic devices 302 can have the respective output engine 315 and output device 317 with similar functional assets that allow each consumer electronic device 302 to transmit and receive mirrored data. However, each consumer electronic device 302 need not be the same consumer electronic device 302. Any of the consumer electronic devices 302 can be a different consumer electronic device 302 having different functional assets for receiving and outputting the mirrored data.

Music can be annotated and users of the different consumer electronic devices 302 can participate in blogging on events and music. The consumer electronic devices 302 can include global positioning systems (GPS) that allow geographical information to be gathered and associated with actions by the consumer electronic devices 302.

Figure 4:
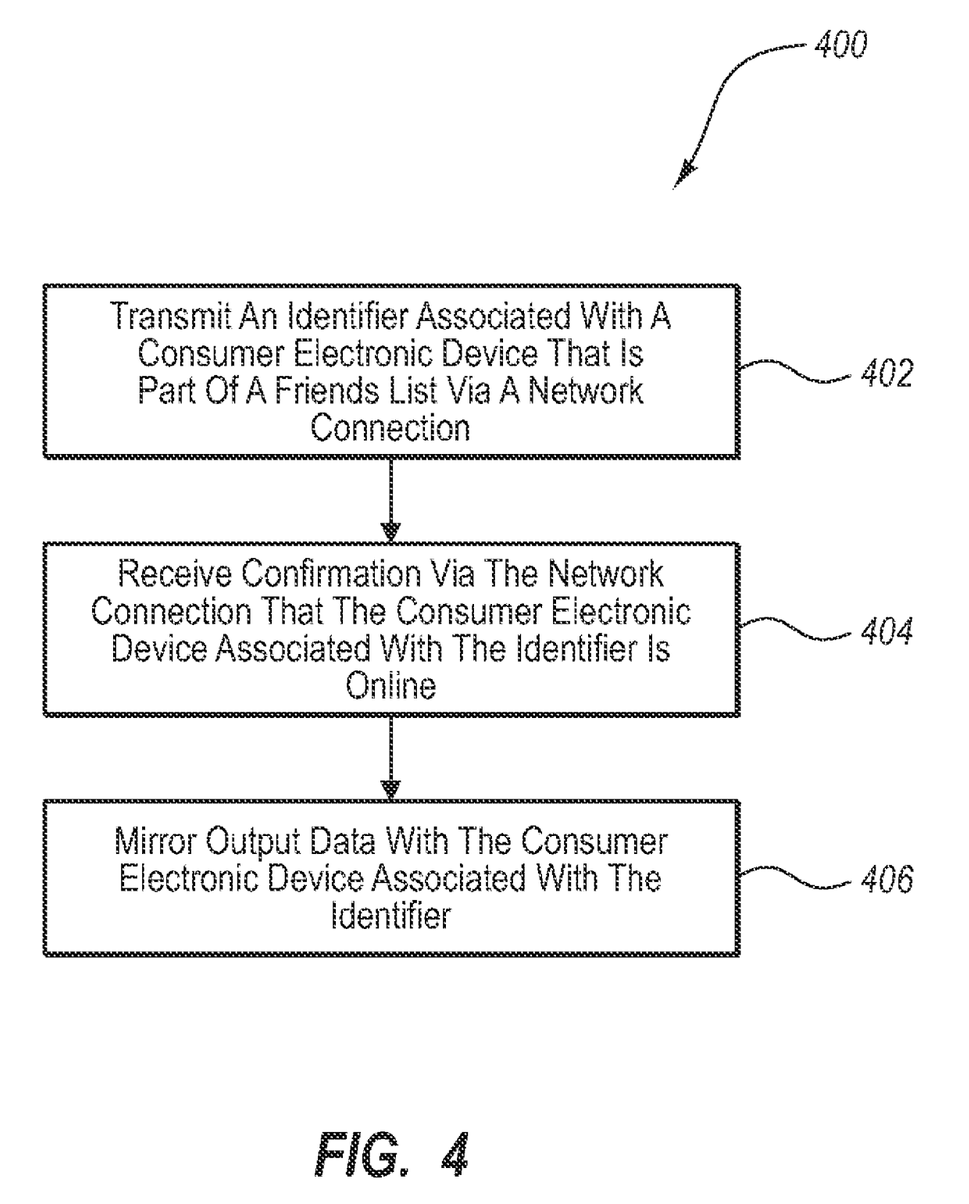
FIG. 4 illustrates a method for mirroring data between consumer electronic devices.

Referring to FIG. 4, a method for mirroring data between consumer electronic devices is illustrated. A first consumer electronic device transmits 402 an identifier associated with a second consumer electronic device that is part of a friends list over a wireless and/or hardwired connection. In one embodiment, several identifiers associated with members of the friends list can be transmitted over the connection to identify a plurality of second consumer electronic devices that are online.

A confirmation verifying that the second consumer electronic device associated with the identifier is online is received 404 via the network connection. The confirmation can also verify that several members of the friends list are online. The confirmation can also be pushed to the consumer electronic device without need for the previous transmission by the consumer electronic device.

Mirrored data including data files and/or commands are mirrored 406 on either the first or second consumer electronic device. The data may be mirrored, for instance, in response to receiving user input at the first consumer device requesting the mirroring of data from the second consumer device. Alternately, the data may be mirrored in response to receiving user input at the second consumer device requesting the mirroring of data from the first consumer device. The data and/or commands can be mirrored such that the consumer electronic devices are substantially synchronized. For example, data or commands describing a screen presentation of a display can be transmitted from the first consumer electronic device to the second consumer electronic device associated with the identifier such that an output engine of the second consumer electronic device displays the same screen presentation substantially simultaneously as the first consumer electronic device transmitting the data describing the screen presentation.

Data in addition to the mirrored data can be sent to either of the consumer electronic devices. For example, audio instant messaging, shared content for enjoyment, presentations, and other communication can be communicated via the network connection. Moreover the content can also be mirrored such that any number of consumer electronic devices can be synchronized, enabling media to be shared between two or more of the consumer electronic devices substantially simultaneously.

Figure 5A:
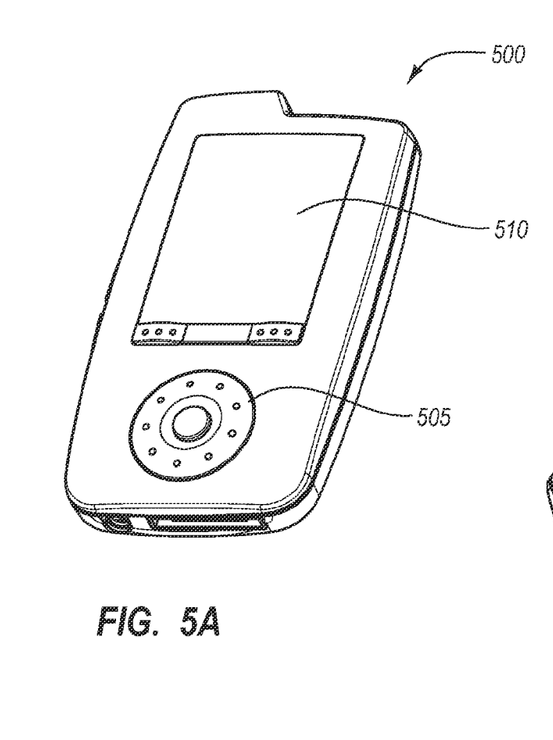
FIGS. 5A, 5B, and 5C illustrate an example embodiment of a consumer electronic device in which the invention may be practiced.
Figure 5B:
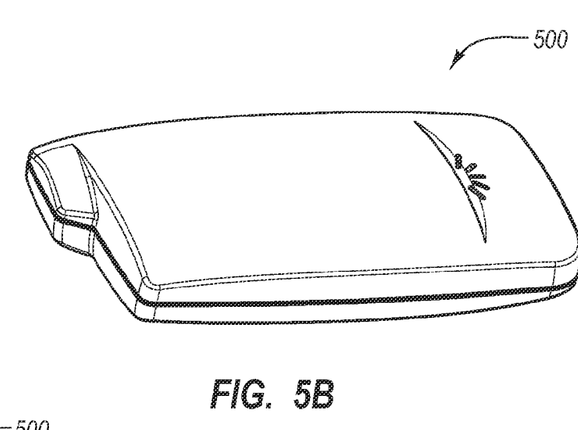
Figure 5C:
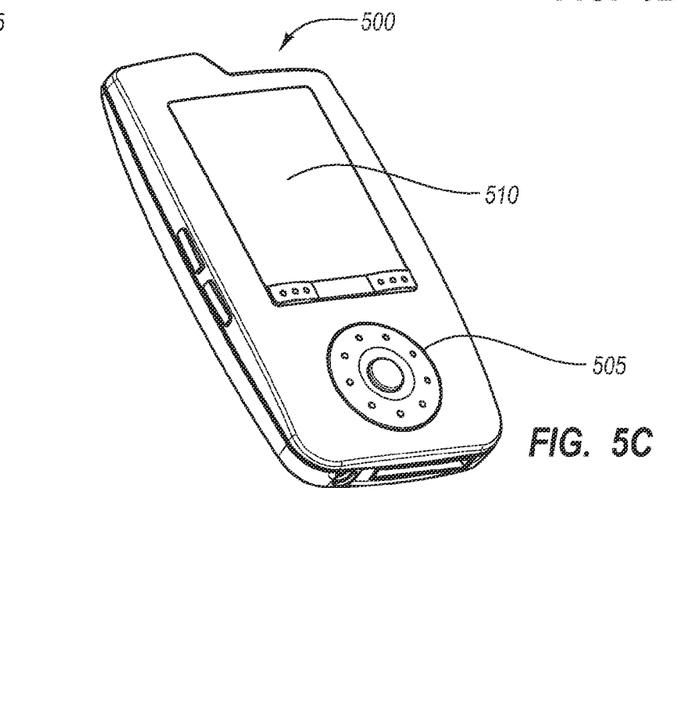

FIG. 5 illustrates a consumer electronic device 500 according to an example embodiment. The consumer electronic device 500 includes a user interface including an input device 505 and an output device 510. The consumer electronic device 500 is a wireless communication device configured to connect to a wireless network connection. The consumer electronic device 500 can also connect directly to another similarly configured electronic device. The consumer electronic device 500 can have any of the functionality and hardware discussed herein as well as other hardware and functionality.

Embodiments of the device may include computer-readable media for carrying or having computer-executable instructions or data structures stored thereon. Such computer-readable media can be any available media that can be accessed by a portable device or general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a portable device or general purpose or special purpose computer. When information is transferred or provided over a network or another communications connection (either hardwired, wireless, or a combination of hardwired and wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Although not required, the invention may be described in the general context of computer-executable instructions, such as program modules, being executed by computers in network environments. Generally, program modules include acts, routines, programs, objects, components, data structures, etc. that perform particular tasks or implement particular abstract data types. Computer-executable instructions, associated data structures, and program modules represent examples of the program code means for executing acts of the methods disclosed herein. The particular sequence of such executable instructions or associated data structures represents examples of corresponding acts for implementing the functions described in such acts.

The devices may also include a magnetic hard disk drive for reading from and writing to a magnetic hard disk, a magnetic disk drive for reading from or writing to a removable magnetic disk, or an optical disk drive for reading from or writing to removable optical disk such as a CD-ROM or other optical media. The device may also include non-volatile memory including flash memory. The drives and their associated computer-readable media provide nonvolatile storage of computer-executable instructions, data structures, program modules and other data. Although the exemplary environment described herein may employ a magnetic hard disk, a removable magnetic disk and/or a removable optical disk, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk, magnetic disk, optical disk, ROM or RAM, including an operating system, one or more application programs, other program modules, and program data. A user may enter commands and information through a keyboard, pointing device, or other input devices (not shown), such as a microphone, joy stick, touch pad, game pad, satellite dish, scanner, or the like. These and other input devices are often connected to the processing unit through a universal serial bus (USB) or serial port interface coupled to system bus. Alternatively, the input devices may be connected by other interfaces, such as a parallel port, or a game port. A display device is also connected to system bus via an interface, such as a video adapter.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. Detailed descriptions of apparatus and processing techniques known in the field of the invention to one of ordinary skill in the art have been excluded

We claim:

1. A method for mirroring data over a network connection, the method comprising:
    transmitting from a first electronic device to a second electronic device via the network connection an identifier associated with the second electronic device, wherein the identifier specifies a group membership for the first and second electronic devices;
    receiving from the network connection information describing whether the second electronic device is online;
    outputting data at the first electronic device;
    transmitting mirrored data to the second electronic device, the mirrored data related to the output data and including commands executed by the first electronic device; and
    executing the commands at the second electronic device substantially simultaneously with the output of the data at the first electronic device such that the mirrored data output at the second electronic device is substantially synchronized with the data output at the first electronic device.

2. A method according to claim 1, further comprising:
    troubleshooting the mirrored data to identify one or more of: problems with the use of the first electronic device and functional problems with the first electronic device.

3. A method according to claim 1, wherein the mirrored data includes one or more of:
    a screen presentation of the first electronic device; visual data;
    audio data;
    commands describing actions taken by a user of the first electronic device; data describing audio data stored on the first electronic device;
    information describing streaming audio;
    video data;
    text data;
    wallpaper;
    a graphical skin; and
    information describing settings and configurations.

4. A method according to claim 1, wherein the network connection is one or more of a wireless network connection and a hard wired network connection.

5. The method according to claim 1, wherein the specified group membership is a friends list.

6. In a mirroring device operating in a network including at least one consumer electronic device, a method of providing customer service, the method comprising:
    receiving a request for customer service from a consumer electronic device, wherein the request for consumer service includes an identifier configured to identify a group membership of a user of the consumer electronic device;
    mirroring data from the consumer electronic device; and
    analyzing the mirrored data to identify one or more of: a problem with the use of the consumer electronic device, and a functional problem with the consumer electronic device.

7. The method of claim 6, wherein mirrored data includes one or more of: commands describing actions taken by a user of the consumer electronic device;
    a skin, wallpaper or graphic for a user interface, the skin, wallpaper or graphic currently being rendered on a display of the consumer electronic device; a screenshot of the display of the consumer electronic device;
    a presentation;
    an audio file currently being rendered by the consumer electronic device; a video file currently being rendered by the consumer electronic device;
    a text file currently being rendered by the consumer electronic device; and
    other media content, including one or more of audio, video and text content.

8. The method of claim 6, wherein the request for customer service identifies one or more of:
    a type of consumer electronic device, the identified type corresponding to the consumer electronic device from which the request is received; and
    information describing a problem encountered with the consumer electronic device.

9. The method of claim 6, wherein mirroring data from the consumer electronic device includes receiving mirrored data from the consumer electronic device, the method further comprising receiving additional data from the consumer electronic device.

10. The method of claim 9, wherein the additional data includes information describing one or more of: upgrades to the consumer electronic device, and configuration settings of the consumer electronic device.

11. The method of claim 6, further comprising, in response to identifying a problem, controlling the operation of the consumer electronic device to resolve the problem.

12. The method of claim 6, further comprising, in response to identifying a problem, transmitting information to the consumer electronic device, the transmitted information including instructions for resolving the problem.

13. The method of claim 12, wherein the instructions for resolving the problem include one or more of:
    instructions to return the consumer electronic device to a retail location where the consumer electronic device was purchased; and
    instructions for reconfiguring the consumer electronic device.

14. In a first electronic device operating in a network including a second electronic device, a method of mirroring data between the devices, the method comprising:
    transmitting from a first electronic device a device identifier associated with a second electronic device over a network connection, the first and second electronic devices being associated with a friends list that specifies electronic devices that are associated with one another;
    receiving a confirmation over the network connection, the confirmation verifying that the second electronic device is online; and
    requesting mirrored data from the second electronic device, wherein the mirrored data includes data executed, created, rendered, or any combination thereof, on the second electronic device.

15. The method of claim 14, wherein the mirrored data is requested from the second electronic device in response to receiving user input at the first electronic device requesting the mirrored data from the second electronic device.

16. The method of claim 14, further comprising: receiving the mirrored data; and presenting the mirrored data to a user of the first electronic device, wherein mirrored data presented on the first electronic device is substantially synchronized with the mirrored data executed, created, rendered, or any combination thereof, on the second electronic device.

17. The method of claim 14, wherein the network connection includes one or more of: a wireless connection and a hardwired connection.

18. The method of claim 14, further comprising, in response to receiving a request from the second electronic device for mirrored data from the first electronic device, transmitting the mirrored data from the first electronic device to the second electronic device.

19. The method of claim 14, wherein the second electronic device comprises a plurality of electronic devices.

* * * * *